United States Patent Office 2,965,503
Patented Dec. 20, 1960

2,965,503

YELLOW GLASS COMPOSITION

Erwin C. Hagedorn and Dallas P. Hall, Toledo, Ohio, assignors to Owens-Illinois Glass Company, a corporation of Ohio No Drawing. Filed Aug. 11, 1958, Ser. No. 754,137

3 Claims. (Cl. 106—52)

This invention relates to glass and more particularly to a yellow or golden yellow glass composition. Previously such glasses have been found difficult to produce with uniformity and homogenity and heretofore it has beed found extremely difficult to obtain a satisfactory pale yellow or amber color in soft or basic glasses such as soda-lime-silica compositions of the type commonly used in continuous tank production wherein the composition is insensitive to variations in melting conditions. In producing yellow glasses in prior practice various materials such as selenium, cadmium, carbon, sulphur, iron, manganese, cerium, titanium and other constituents have been employed as coloring agents but the majority are sensitive to some degree to volatilization and oxidizing and reducing conditions within the furnace which make them objectionable for tank melting. Changes in the individual coloring constituents when employed singly or in known combinations and amounts have occurred during melting so that loss of control over the precise coloration of the pale yellow is a frequent result.

Accordingly, it is an object of this invention to provide a yellow or golden yellow glass composition which may be precisely controlled as to color without limitations being placed on melting conditions, the glass having forming properties applicable to the manufacture of machine-made glassware such as glass containers, tumblers and the like with constant coloration.

Another object of this invention is to produce a pale golden yellow glass composition which exhibits only slight coloration in thin sections and more definite coloration in thick sections such as heavy bottomed tumblers, for example, the glass having working characteristics comparable to other soda-lime-silica glasses and color stability for continuous tank melting, the color being induced by a novel combination of three color-producing constituents in prescribed amounts.

A further object of this invention is to furnish a glass having a yellow amber or golden yellow coloration based upon conventional soda-lime-silica glasses with prescribed amounts of economical color-producing constituents of titanium oxide, iron oxide and nickel oxide utilized in combination to provide the desired coloration of the glass.

The specific nature of this invention, as well as other objects and advantages thereof, will become apparent to those skilled in the art from the following detailed description.

Previously, the glass making art has taught the use of nickel oxide and zinc oxide in combination to provide a light yellow tint as taught in the patent to Blau, Patent No. 2,282,601, issued May 12, 1942. This patent describes the production of a yellow or amber tinted glass with a small percentage of nickel depending largely upon the presence of zinc oxide and if the zinc is omitted the color reverts to a violet or grayish coloration.

The present invention utilizes prescribed amounts of titanium oxide, iron oxide and nickel oxide in glass containing silica, alkaline earth oxides, and alkali metal oxides with or without a minor amount of alumina to provide a readily duplicatable glass composition having a distinctive pale golden yellow color.

It has been known that nickel oxide in ordinary glasses produces a coloration which approaches either violet or brown and such glasses employing nickel alone have shown rather low light transmission in the yellow range. In most glasses nickel has found use as a decolorizer rather than as a colorizing agent.

In our invention we have found that by using the combination of from about 4 to 6% titanium oxide, from about 0.05 to 0.09% iron oxide, and from about 0.003 to 0.006% nickel oxide in a basic soda-lime composition a pale yellow tint is secured which may be accurately reproduced while maintaining proper working temperatures of the glass for high-speed machine production of glassware.

The following compositions based upon analyses by weight of individual melts of the subject glass are examples of glasses made in accordance with this invention.

|  | A | B | C | D | E |
|---|---|---|---|---|---|
| $SiO_2$ | 70.385 | 70.385 | 70.420 | 70.349 | 67.271 |
| $Al_2O_3$ | 2.11 | 2.11 | 2.11 | 2.11 | 1.17 |
| CaO | 4.94 | 4.31 | 4.31 | 4.31 | 7.01 |
| MgO | 3.40 | 2.97 | 2.97 | 2.97 | 4.64 |
| $Na_2O$ | 13.90 | 13.90 | 13.90 | 13.90 | 13.68 |
| $K_2O$ | 0.39 | 0.39 | 0.39 | 0.39 | 0.21 |
| $TiO_2$ | 4.80 | 5.86 | 5.86 | 5.86 | 5.98 |
| $Fe_2O_3$ | 0.070 | 0.00 | 0.033 | 0.106 | 0.034 |
| NiO | 0.005 | 0.005 | 0.007 | 0.005 | 0.005 |
| Total | 100.000 | 100.000 | 100.000 | 100.000 | 100.000 |

I.C.I. colorimetric values—(sample thickness—10 millimeters)

|  | A | B | C | D | E |
|---|---|---|---|---|---|
| Percent Brightness | 81.5 | 80.7 | 79.0 | 79.2 | 81.1 |
| Percent Purity | 6.5 | 8.8 | 7.1 | 9.8 | 8.2 |
| Dominant Wave Length (mu): | 573 | 573 | 574 | 573 | 573 |

Glasses designated by the letters A through E are transparent and each exhibits a pale golden yellow color with basically similar color characteristics. The constituents of these yellow glasses are modified within prescribed limits to produce a commercial glass having desired working properties including necessary viscosities and liquidus temperatures for fabricating hollow glass containers in press-and-blow operations, for example.

The invention contemplates that the subject yellow glasses may have the following ranges of constituents based upon chemical analyses by weight:

|  | Percent |
|---|---|
| $SiO_2$ | 65 to 75 |
| $Al_2O_3$ | 0.2 to 3 |
| CaO+MgO | 6 to 14 |
| $Na_2O+K_2O$ | 12 to 16 |
| $TiO_2$ | 4 to 6 |
| $Fe_2O_3$ | 0.05 to 0.09 |
| NiO | 0.003 to 0.006 |

*I.C.I. colorimetric values*

| Brightness | percent | 79–83 |
|---|---|---|
| Purity | do | 6–10 |
| Dominant wavelength | (mu) | 572–574 |

*Thermal properties*

|  | °C. |
|---|---|
| Liquidus temperature | 870 to 1070 |
| Fiber softening point | about 735 |
| Annealing point | about 550 |
| Strain point | about 520 |

The actual batch components to produce the above defined glass may be varied widely as known in the glass making art.

The glass may also be defined as composed of the following oxides by weight:

"F" | Percent
--- | ---
$SiO_2$ | about 70
$Al_2O_3$ | about 2
$CaO+MgO$ | 6 to 14
$Na_2O+K_2O$ | 12 to 16
$TiO_2$ | about 4.6
$Fe_2O_3$ | about 0.07
NiO | about 0.005

This glass has generally the same I.C.I. colorimetric values as indicated above of about 80% brightness, about 6 to 10% purity and a dominant wave length of about 573 millimicrons. The thermal properties are also basically the same as above.

The following composition "G" comprises one preferred example of the subject glass. The glass may be prepared from the following batch constituents by weight:

"G" | |
--- | --- | ---
Sand | lbs | 400
Soda ash | lbs | 129
Nepheline syenite | lbs | 45
Niter | lbs | 7
Burnt dolomitic lime | lbs | 47
Salt cake | lbs | 3
Titanium oxide | lbs. 4 oz | 29
Arsenic oxide | lb. 3 oz | 1
Red Iron oxide | oz. (101 gms.) | 3.57
Black nickel oxide | oz. (12 gms.) | 0.425

The percentage composition of this glass in heat-reacted condition follows:

"G" | Percent
--- | ---
$SiO_2$ | 70.56
$Al_2O_3$ | 1.85
CaO | 5.04
MgO | 3.57
$Na_2O$ | 13.81
$K_2O$ | 0.33
$TiO_2$ | 4.62
$Fe_2O_3$ | 0.076
NiO | 0.005
Total | 99.87

This glass has a liquidus temperature of 930° C., a fiber softening point of 740° C., an annealing point temperature of 550° C., and a strain point temperature of 520° C. The glass has a coefficient of thermal expansion measured over the range of from 0 to 300° C. of approximately $82 \times 10^{-7}$ cm. per cm. per degree C. and a density of 2.50 grams per cubic centimeter. This particular glass exhibits I.C.I. colorimetric values of 80.4% brightness, 7.0% purity and 573 millimicrons of dominant wave length.

The I.C.I. colorimetric values are based upon the I.C.I. Chromaticity Diagram. I.C.I. refers to the International Commission of Illumination and the diagram defines color in terms of mixtures of theoretical colored lights. The I.C.I. system makes possible the exact specification of colors by means of a "color map." The I.C.I. system of color notation specifies the color of glasses in terms of brightness, purity and dominant wave length. "Brightness," which is usually expressed in terms of percentage, is the amount of visual response in a normal observer to the radiation emergent from a transparent object relative to the response in this observer to the radiation incident upon the object. Thus, brightness may be briefly termed the lightness of color of an object. "Purity," which is also normally expressed in terms of percentage, is a measure of the monochromaticness of a color with monochromatic light having a purity of 100%. By diluting the monochromatic radiation with white light made up of all wave lengths, we thereby dilute the color and reduce the purity. "Dominant wave length," usually expressed in millimicrons (mu), is the wave length of monochromatic light appearing to the eye to have the same "hue" as the mixed light actually encountered.

Various modifications may be resorted to within the scope of the appended claims.

We claim:

1. A soda-lime-silica glass consisting essentially of the following composition:

| | Percent
--- | ---
$SiO_2$ | 65 to 75
$Al_2O_3$ | 0.2 to 3
$CaO+MgO$ | 6 to 14
$Na_2O+K_2O$ | 12 to 16
$TiO_2$ | 4 to 6
$Fe_2O_3$ | 0.05 to 0.09
NiO | 0.003 to 0.006 which glass has a golden yellow color and colorimetry values of from 79 to 83% brightness, from 6 to 10% purity and a dominant wave length of from 572 to 574 millimicrons based upon I.C.I. colorimetric values.

2. A soda-lime-silica glass consisting essentially of the following composition:

| | Percent
--- | ---
$SiO_2$ | about 70
$Al_2O_3$ | about 2
$CaO+MgO$ | 6 to 14
$Na_2O+K_2O$ | 12 to 16
$TiO_2$ | about 4.6
$Fe_2O_3$ | about 0.07
NiO | about 0.005 which glass has a golden yellow color and colorimetry values of about 80% brightness, about 6 to 10% purity and a dominant wave length of about 573 millimicrons based upon the I.C.I. colorimetric values.

3. A soda-lime-silica glass consisting essentially of the following composition:

| | Percent
--- | ---
$SiO_2$ | about 70
$Al_2O_3$ | about 2
CaO | about 5
MgO | about 3.5
$Na_2O$ | about 14
$K_2O$ | about 0.4
$TiO_2$ | about 4.6
$Fe_2O_3$ | about 0.07
NiO | about 0.005 which glass has a golden yellow color and colorimetry values of about 80% brightness, about 7% purity and a dominant wave length of about 573 millimicrons based upon I.C.I. colorimetric values.

References Cited in the file of this patent

UNITED STATES PATENTS

| | | |
--- | --- | ---
1,754,182 | Taylor | Apr. 8, 1930
2,321,987 | Brown | June 15, 1943
2,443,142 | Lyle | June 8, 1948
2,554,952 | Mockrin et al. | May 29, 1951
2,688,560 | Armistead | Sept. 7, 1954
2,688,561 | Armistead | Sept. 7, 1954